Aug. 20, 1968    L. A. PRENTICE    3,397,590

HELICAL GEAR DRIVE MECHANISM WITH ANTI-BACKLASH MEANS

Filed March 2, 1967

LEON A. PRENTICE
INVENTOR

BY
BUCKHORN, BLORE, KLARQUIST & SPARKMAN
ATTORNEYS

United States Patent Office 3,397,590
Patented Aug. 20, 1968

3,397,590
HELICAL GEAR DRIVE MECHANISM WITH
ANTI-BACKLASH MEANS
Leon A. Prentice, Portland, Oreg., assignor to Tektronix,
Inc., Beaverton, Oreg., a corporation of Oregon
Filed Mar. 2, 1967, Ser. No. 620,174
12 Claims. (Cl. 74—409)

ABSTRACT OF THE DISCLOSURE

A dial drive mechanism for simultaneously driving tuning means having parallel operating shafts. A first such operating shaft is provided with a tuning knob and a helical driving gear engaging a pair of driven gears on a pair of intermediate shafts angularly disposed with respect to such first operating shaft. Helical driving gears on both the intermediate shafts drive a helical driven gear on the second operating shaft thereby completing a driving mechanism wherein backlash can be substantially eliminated. An indicating dial tape is driven by a sprocket secured to one of the intermediate shafts.

Background of the invention

Figure 2:
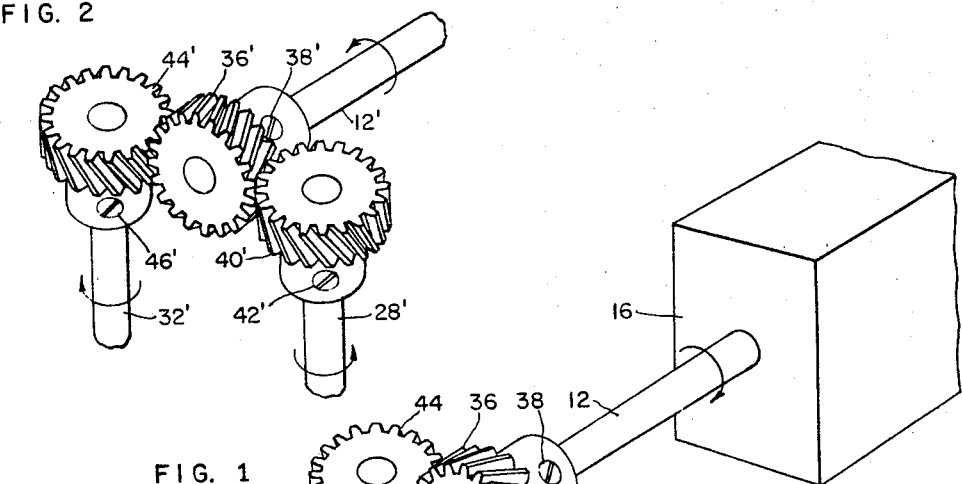

The present invention relates to a drive mechanism for driving a pair of shafts in unison and particularly to such a mechanism for driving a pair of spaced shafts wherein backlash between the shafts is substantially eliminated.

In electronic instruments and the like it is frequently desirable to drive a pair of shafts for operating tuning devices in unison so that such tuning devices will closely and accurately track with one another whenever the operating shafts are rotated. A variety of drive mechanisms including belts, cords and gearing are available but most are not adaptable for extremely accurate tracking. Gearing provides positive drive but most gearing mechanisms are subject to backlash and therefore the drive may become inaccurate.

While a number of anti-backlash systems are known, most are not readily adaptable to the driving of two shafts spaced at an arbitrary distance from one another, unless a fairly complex mechanism is employed. Some known systems are applicable only to in-line shafts but one known system is usable for spaced shafts. Such a system employs parallel gears or gear trains.

In the last mentioned system, a pair of driving gears mounted on one shaft engage a pair of driven gears mounted on the other shaft, either directly or through an intermediate train. The number and size of the gears are dictated not only by the desired relative speed of the operating shafts but also by the spacing between the shafts. If few gears are to be used, the gears required may have to be large in size if the shafts are spaced, or if a larger number of gears are used, then the mechanism becomes more complex and difficult to adjust. A single gear train employing split gearing at the location of each gear engagement can be utilized but this arrangement can also be somewhat complex.

Summary of the invention

In accordance with the present invention, a drive mechanism suitable for continuously tracking a pair of spaced operating shafts, includes a pair of intermediate shafts disposed at an angle to both the operating shafts. Assuming a first operating shaft is an input shaft driven by a dial knob or the like, a gear secured to such shaft may be designated as a driving gear. This driving gear, which is preferably a helical gear, engages helical driven gears on both the intermediate shafts. Then driving gears secured on the intermediate shafts at the location of the second operating shaft or output shaft engage a helical gear secured upon such shaft. Since the gearing just described constitutes a continuous closed train or circuit, adjustment of the gears upon their respective shafts may be made substantially to eliminate backlash.

In a preferred embodiment, an indicator is also provided for ascertaining the desired position of the operating shafts. An indicating tape having sprocket holes is engaged by a sprocket means mounted upon one of the aforementioned intermediate shafts and this tape is marked so that the marking may be viewed from the driving knob side of the mechanism. Such an arrangement provides a considerable spread in indication for accurately positioning the operating shafts.

Accordingly, an object of the present invention is to provide an improved drive mechanism for a pair of operating shafts.

It is another object of the present invention to provide an improved drive mechanism for synchronizing the operation of a pair of spaced operating shafts while eliminating backlash between such shafts.

It is another object of the present invention to provide an improved drive mechanism for a pair of spaced output shafts which can be adapted for driving the shafts in the same direction or in opposite directions in substantial synchronism with one another.

It is another object of the present invention to provide an improved drive mechanism for a pair of operating shafts and also including an indicator having a wide movement spread for accurately indicating the synchronized position of such operating shafts.

The subject matter which I regard as my invention is particularly pointed out and distinctly claimed in the concluding portion of this specification. The invention, however, both as to organization and method of operation, together with further advantages and objects thereof, may best be understood by reference to the following description taken in conjunction with the accompanying drawings wherein like reference characters refer to like elements:

Drawings

Figure 1:
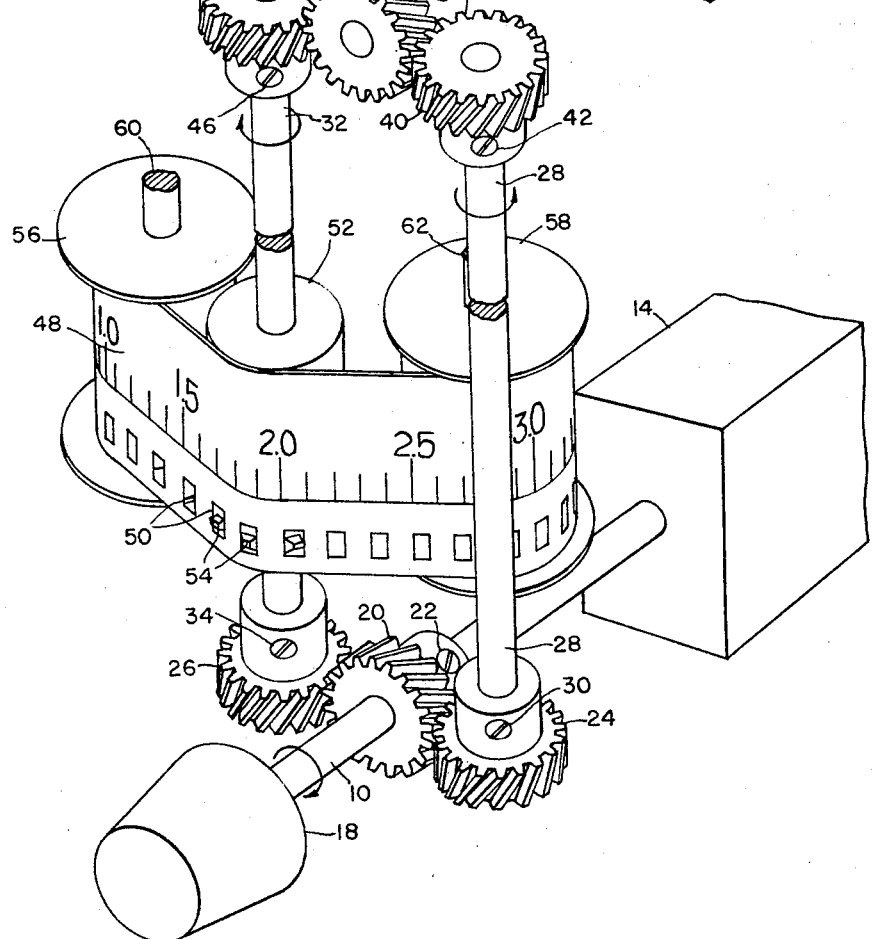

FIG. 1 is a perspective view of a drive mechanism in accordance with the present invention; and FIG. 2 is a perspective drawing of an alternative portion of a drive mechanism in accordance with the present invention.

Detailed description

Referring to FIG. 1, a pair of spaced operating shafts 10 and 12 which are preferably substantially parallel are connected in driving relation to respective tuning means 14 and 16. These tuning means 14 and 16 may comprise variable condensers in an electronic instrument or variable means for tuning a pair of tunable microwave cavities, e.g., in a spectrum analyzer device or the like. Alternatively, the tuning means may be included in the radio frequency and oscillator circuits of radio receiving apparatus. However, it is desired that the tuning means accurately track in order to provide, for example, a constant difference in the frequency to which the respective tuning means are tuned. The tuning means may be located at some distance from one another if so desired. Shaft 10, called an input shaft, may be driven with a dial knob 18 conveniently disposed on the opposite side of a front panel or operating panel (not shown) from the tuning means and the present drive mechanism. Shaft 12 may therefore be designated an output shaft although, of course, both shafts operate their respective tuning means.

A driving gear 20, preferably taking the form of a helical gear, is secured upon shaft 10 by means of set screw 22. Driving gear 20 engages driven gears 24 and 26 disposed on either side of driving gear 20. Gears 24 and 26 also preferably comprise helical gears. Driven gear 24 is secured to a first intermediate shaft 28 with set screw 30, while driven gear 26 is similarly secured upon intermediate shaft 32 by means of set screw 34. Since driven gears 24 and 26 are disposed on either side of driving gear 20, then intermediate shafts 28 and 32 carrying such gears are also located substantially on either side of driving gear 20, as well as on either side of input shaft 10. The intermediate shafts 28 and 32 extend at an angle, preferably a right angle, with respect to shaft 10 to either side of output shaft 12 carrying a driven gear 36, desirably also a helical gear, secured to shaft 12 by means of set screw 38. Intermediate shaft 28 carries a driving gear 40 joined to shaft 28 with set screw 42 and having a driving engagement with gear 36. Similarly, intermediate shaft 32 carries a driving gear 44 secured thereto with set screw 46 and having a driving engagement with the gear 36. Gears 40 and 44 are also desirably helical. Input and output shafts 10 and 12 are spaced from one another and are preferably parallel, and therefore the intermediate shafts 28 and 32 are in such case also angularly related to output shaft 12 and desirably make a right angle therewith.

Although preferable, it is not essential that shafts 10 and 12 be parallel. Thus, shafts 12 and 10 may be located in spaced, e.g., upper and lower, parallel planes with the axes of the shafts twisted in those planes with respect to one another. In such case, the intermediate shafts 28 and 32 will not be parallel to one another but will make similar but opposite angles with respect to such planes. It is also possible for the input and output shafts to be tilted with respect to the aforementioned parallel planes. However, under ordinary circumstances and to obtain an optimum utility, the shafts 10 and 12 are substantially parallel as illustrated in FIG. 1. When the shafts 10 and 12 are parallel and intermediate, shafts 28 and 32 are perpendicular thereto, then gears 20, 24, 26, 38, 40 and 44 are most suitably helical gears.

The drive mechanism is also provided with indicating means including a flexible tape 48 which may be formed of flexible plastic or metal and which is provided with indicating numbers or other indicia on the same side of such tape as dial knob 18. The tape is also provided with a plurality of sprocket-engaging holes 50 for engaging a sprocket means 52, the latter taking the form of a roller secured upon intermediate shaft 32. The roller is provided with sprocket teeth 54 for engaging the sprocket holes 50 and also supports the tape 48 in an attitude substantially parallel to intermediate shaft 32 at the location where the tape is engaged by sprocket means 52. Each end of the tape 48 is coiled upon a spool or roller, the respective spools or rollers 56 and 58 being journaled upon shafts 60 and 62, respectively, located on either side of intermediate shaft 32 and substantially parallel thereto.

In operation, when the dial knob 18 is rotated in a clockwise direction, the shaft 10 is rotated thereby in a clockwise direction for tuning the tuning means 14. Engagement of helical gears 24 and 26 by gear 20 produces counterclockwise and clockwise motion of these shafts, respectively, and the gears 40 and 44 engage gear 36 to turn output shaft 12 in a clockwise direction in order to operate tuning means 16 in synchronism with tuning means 14. The gearing provides positive drive preferable to cords, belts and the like and backlash-free operation as hereinafter more fully described. The shafts 28 and 32 are illustrated as broken to indicate that shafts 10 and 12 may be displaced at any desired distance from one another.

It is observed that for the gearing as illustrated in FIG. 1, wherein gear 44 is matched to have substantially the same tooth engagement as gear 26, and gear 40 is matched to have substantially the same tooth configuration as gear 24, e.g., where all the gears may be designated as right-hand gears, then shafts 10 and 12 will turn in the same direction. However, a reverse situation is illustrated in FIG. 2. In FIG. 2, wherein similar elements are designated with primed reference numerals, a pair of intermediate shafts and an output shaft are provided with gears 40', 36' and 44' having the opposite hand gear teeth to corresponding gears in FIG. 1. Assuming the input shaft driving gear and the intermediate shaft driven gears are the same as illustrated in FIG. 1, then rotation of output shaft 12' will be in the opposite or counterclockwise direction. This ability to select the direction of the output shaft relative to the input shaft constitutes one advantage of the present invention.

Turning of the dial knob 18 in a clockwise direction also transports flexible tape 48 in a direction from right to left across sprocket means 52. A considerable amount of this tape may be stored, for example, in coiled fashion on roller 58 and unwound for storage on roller 56. A continuous indicia related to the tuning of the tuning means is thereby provided for continuous registration during a plurality of continuous rotation of dial knob 18. There results a considerable spread of indicia and desired accuracy of indication commensurate with the accuracy of the drive mechanism. The indicia on the flexible tape 48 may be viewed through an opening in a front panel (not shown) which may be suitably provided with a pointer for alignment with the indicia.

Since the gearing of the present drive mechanism forms a closed train or circuit starting at gear 20 and extending, e.g., though gears 24, 40, 36, 44, 26 and back to 20, in that order, the gearing is desirably adjusted to substantially eliminate backlash in the system and produce very accurate tracking between shafts 10 and 12. The mechanism is provided with means adaptable for maintaining all the gears in engaged relation and for tightening the train formed by the gears to substantially eliminate backlash. In the illustrated embodiment, such means comprises the set screws employed with each of the gears. In order to eliminate backlash, the set screws of all gears are tightened to the respective shafts except for one gear. Consider, for example, gears 40 and 24 mounted on shaft 28. All of the set screws in the system may be tightened except for one set screw, e.g., set screw 42 associated with gear 40. This will allow limited rotation of gear 40 with respect to gear 24 within the blacklash rotational limit of the system. Gear 40 is moved in the opposite direction to gear 24 to take up the slack and is then retightened by means of set screw 42 at the limit point. All tooth clearance is thereby eliminated and the train will operate accurately and substantially without backlash.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

What is claimed is:
1. A drive mechanism comprising:
an input shaft adaptable for receiving a driving means connected thereto for turning said input shaft,
an output shaft spaced from said input shaft,
a pair of intermediate shafts angularly related to at least one of the aforementioned shafts wherein one such intermediate shaft is disposed on one side of both said input and output shafts and wherein the other intermediate shaft is disposed on the opposite side of both said input and output shafts,
driven gears on both said intermediate shafts disposed adjacent said input shaft, and a driving gear on said input shaft for driving both the driven gears on said intermediate shafts,
driving gears on both said intermediate shafts adjacent said output shaft and a driven gear on said output shaft engaged by both said driving gears on said intermediate shafts, and means associated with said mechanism adaptable for maintaining all said gears in closely engaged relation so as to tighten the train formed by said gears and substantially eliminate backlash between said input and output shafts.

2. The mechanism according to claim 1 wherein said gears are helical gears.

3. The mechanism according to claim 2 wherein the gears on said intermediate shafts are positioned to have substantially the same tooth configuration.

4. The mechanism according to claim 2 wherein said driving gears on said intermediate shaft and said driven gear on said output shaft are constructed with opposite hand gear teeth from said driving gear on said input shaft and said driven gears on said intermediate shafts so that output shaft turns in a direction opposite from said input shaft.

5. The mechanism according to claim 1 wherein said input and output shafts are substantially parallel.

6. The mechanism according to claim 1 wherein said intermediate shafts are disposed at right angles to both said input and output shafts.

7. The mechanism according to claim 6 wherein said gears are helical gears.

8. The mechanism according to claim 1 for mounting in an instrument including separate spaced tuning means driven by corresponding portions of said input and output shafts, and wherein a said driving means for said input shaft is located on said input shaft on the opposite side of said driving gear from the tuning means driven by said input shaft and comprises a tuning knob suitable for operation of said mechanism from a front portion of said instrument located in front of said tuning means.

9. The mechanism according to claim 1 further including:

sprocket means secured upon one of said intermediate shafts, and an indicating tape provided with sprocket holes for engagement by said sprocket means wherein said tape where engaged is substantially parallel to the intermediate shaft carrying said sprocket means, said sprocket holes being engaged by said sprocket means for driving said tape to provide an indication of the position of said shafts.

10. The mechanism according to claim 9 further including:

roller means located on either side of said intermediate shaft and having axes substantially parallel thereto, said roller means receiving end coiled portions of said tape.

11. The mechanism according to claim 9 wherein said tape bears indicia facing outwardly from said sprocket means for indicating the position of said mechanism.

12. The mechanism according to claim 1 wherein said means for maintaining all said gears in engaged relation comprises set screw means associated with at least one of said gears and which is tightened with all said gears in firmly engaged relation.

References Cited

UNITED STATES PATENTS

| | | | |
|---|---|---|---|
| 2,903,894 | 9/1959 | Legros | 74—10.8 |
| 3,267,749 | 8/1966 | Tanner et al. | 74—10.45 |

FRED C. MATTERN, JR., *Primary Examiner.*

LEONARD H. GERIN, *Assistant Examiner.*